United States Patent
Chen et al.

(10) Patent No.: US 11,981,778 B2
(45) Date of Patent: May 14, 2024

(54) CHEMICAL RECYCLING OF ADDITIVELY MANUFACTURED OBJECTS

(71) Applicant: CARBON, INC., Redwood City, CA (US)

(72) Inventors: Kai Chen, Sunnyvale, CA (US); Benjamin Huan Yang, McLean, VA (US)

(73) Assignee: Carbon, Inc., Redwood City, CA (US)

(*) Notice: Subject to any disclaimer, the term of this patent is extended or adjusted under 35 U.S.C. 154(b) by 9 days.

(21) Appl. No.: 17/791,073

(22) PCT Filed: Jan. 13, 2021

(86) PCT No.: PCT/US2021/013177
§ 371 (c)(1),
(2) Date: Jul. 6, 2022

(87) PCT Pub. No.: WO2021/146237
PCT Pub. Date: Jul. 22, 2021

(65) Prior Publication Data
US 2023/0025425 A1  Jan. 26, 2023

Related U.S. Application Data

(60) Provisional application No. 62/962,502, filed on Jan. 17, 2020.

(51) Int. Cl.
C08J 11/08 (2006.01)

(52) U.S. Cl.
CPC .......... *C08J 11/08* (2013.01); *C08J 2375/02* (2013.01); *C08J 2375/04* (2013.01)

(58) Field of Classification Search
CPC .......... B29B 17/02; B29B 2017/0203; B29B 2017/0224; B29B 2017/0231; B29B 2017/0237; B29B 2017/0293; B29B 2017/0468; B29B 2017/0484; B29C 64/124; B29C 64/357; B29K 2075/00; B33Y 40/00; C08J 11/08; C08J 2300/208; C08J 2375/02; C08J 2375/04; Y02W 30/52; Y02W 30/62
See application file for complete search history.

(56) References Cited

U.S. PATENT DOCUMENTS

| | | | |
|---|---|---|---|
| 3,213,058 A | 10/1965 | Boyle et al. |
| 3,694,389 A | 9/1972 | Levy |
| 3,932,342 A | 1/1976 | Nagata et al. |
| 4,075,151 A | 2/1978 | Olstowski |
| 4,785,075 A | 11/1988 | Shimp |
| 5,236,637 A | 8/1993 | Hull |
| 5,391,072 A | 2/1995 | Lawton et al. |
| 5,506,007 A | 4/1996 | Williams et al. |
| 5,529,473 A | 6/1996 | Lawton et al. |
| 5,618,881 A | 4/1997 | Hojabr |
| 5,667,890 A | 9/1997 | Ballard et al. |
| 5,908,894 A | 6/1999 | Genz et al. |
| 6,362,288 B1 | 3/2002 | Brewer et al. |
| 6,433,121 B1 | 8/2002 | Petrovic et al. |
| 6,569,955 B1 | 5/2003 | Brewer et al. |
| 6,861,475 B2 | 3/2005 | Ilenda et al. |
| 6,916,867 B2 | 7/2005 | Gugumus |
| 7,144,955 B2 | 12/2006 | Grace et al. |
| 7,157,586 B2 | 1/2007 | Wood et al. |
| 7,438,846 B2 | 10/2008 | John |
| 7,625,977 B2 | 12/2009 | Lutz et al. |
| 7,642,316 B2 | 1/2010 | Rego et al. |
| 7,695,643 B2 | 4/2010 | Fritzsche et al. |
| 7,892,474 B2 | 2/2011 | Shkolnik et al. |
| 8,088,245 B2 | 1/2012 | Lutz et al. |
| 8,110,135 B2 | 2/2012 | El-Siblani |
| 8,378,053 B2 | 2/2013 | Shigemori et al. |

(Continued)

FOREIGN PATENT DOCUMENTS

| | | |
|---|---|---|
| CN | 204955198 U | 1/2016 |
| DE | 102010062875 A1 | 6/2012 |

(Continued)

OTHER PUBLICATIONS

International Search Report and Written Opinion corresponding to PCT/US2021/013177; dated May 21, 2021 (9 pages).
Janusziewicz, Rima, et al., "Layerless fabrication with continuous liquid interface production", PNAS, 113(42), 2016, 11703-11708.
Tumbleston, John R., et al., "Continuous liquid interface production of 3D Objects", Science, 347(6228), 2015, 1349-1352.
International Search Report and Written Opinion corresponding to PCT/US2019/019488; dated Jul. 19, 2019 (24 pages).

(Continued)

*Primary Examiner* — Frances Tischler
(74) *Attorney, Agent, or Firm* — Myers Bigel, P.A.

(57) ABSTRACT

Provided is a method of recycling an additively manufactured object into a reusable thermoplastic polymer, which method in some embodiments may include: (a) providing at least one additively manufactured object produced by stereolithography from a dual cure resin, the object comprising (i) a light polymerized polymer, and (ii) a heat polymerized polymer intermixed with said light polymerized polymer; (b) comminuting the object to produce a particulate material therefrom; (c) contacting the particulate material to a polar, aprotic solvent for a time and at a temperature sufficient to extract the heat polymerized polymer from the particulate material into said solvent, leaving residual particulate material comprising said light polymerized polymer in solid form; (d) separating the residual particulate material from said solvent; and then (e) separating the heat polymerized polymer from said solvent to provide a reusable thermoplastic polymer material in solid form.

18 Claims, 1 Drawing Sheet

(56) References Cited

U.S. PATENT DOCUMENTS

| | | |
|---|---|---|
| 9,090,765 B2 | 7/2015 | Schall et al. |
| 9,200,108 B2 | 12/2015 | Bruchmann et al. |
| 9,205,601 B2 | 12/2015 | Desimone et al. |
| 9,211,678 B2 | 12/2015 | Desimone et al. |
| 9,216,546 B2 | 12/2015 | Desimone et al. |
| 9,376,451 B1 | 6/2016 | Huber et al. |
| 9,453,142 B2 | 9/2016 | Rolland et al. |
| 9,598,606 B2 | 3/2017 | Rolland et al. |
| 9,631,078 B2 | 4/2017 | Escobar Barrios et al. |
| 9,676,963 B2 | 6/2017 | Rolland et al. |
| 10,259,171 B2 | 4/2019 | Robeson et al. |
| 10,316,213 B1 | 6/2019 | Arndt et al. |
| 10,434,706 B2 | 10/2019 | Robeson et al. |
| 2004/0006964 A1 | 1/2004 | Sironi et al. |
| 2004/0067318 A1 | 4/2004 | Jones et al. |
| 2004/0225101 A1 | 11/2004 | Selling et al. |
| 2005/0096400 A1* | 5/2005 | Villwock ............... C08J 11/08 521/49 |
| 2010/0137504 A1 | 6/2010 | Kuhlmann et al. |
| 2013/0202392 A1 | 8/2013 | Morimoto et al. |
| 2013/0292862 A1 | 11/2013 | Joyce |
| 2013/0295212 A1 | 11/2013 | Chen et al. |
| 2014/0371406 A1 | 12/2014 | Esbelin et al. |
| 2015/0184039 A1 | 7/2015 | Lutz et al. |
| 2015/0209978 A1 | 7/2015 | Snyder et al. |
| 2015/0215430 A1 | 7/2015 | Votour |
| 2015/0240113 A1 | 8/2015 | Pratt et al. |
| 2015/0331402 A1 | 11/2015 | Lin et al. |
| 2015/0360419 A1 | 12/2015 | Willis et al. |
| 2016/0137839 A1 | 5/2016 | Rolland et al. |
| 2016/0288376 A1 | 10/2016 | Sun et al. |
| 2017/0129167 A1 | 5/2017 | Castanon |
| 2017/0129169 A1 | 5/2017 | Batchelder et al. |
| 2018/0030234 A1* | 2/2018 | Priedeman, Jr. ........ B29C 64/40 |
| 2018/0126630 A1 | 5/2018 | Panzer et al. |
| 2018/0243976 A1 | 8/2018 | Feller |
| 2018/0290374 A1 | 10/2018 | Willis et al. |
| 2019/0160733 A1 | 5/2019 | Mirkin et al. |
| 2020/0174367 A1* | 6/2020 | Chen ..................... B29C 64/124 |

FOREIGN PATENT DOCUMENTS

| | | |
|---|---|---|
| JP | S5745027 A | 3/1982 |
| WO | 2015109141 A1 | 7/2015 |
| WO | 2015164234 A1 | 10/2015 |
| WO | 2016145182 A1 | 9/2016 |
| WO | 2017112571 A1 | 6/2017 |
| WO | 2017210298 A1 | 12/2017 |
| WO | WO-2018226943 A1 * | 12/2018 .......... B29C 64/124 |
| WO | 2019168807 A1 | 9/2019 |

OTHER PUBLICATIONS

Ford, et al., "Additive manufacturing and sustainability: an exploratory study of the advantages and challenges" Journal of Cleaner Production, 137(20): 1573-1587 (2016).

* cited by examiner

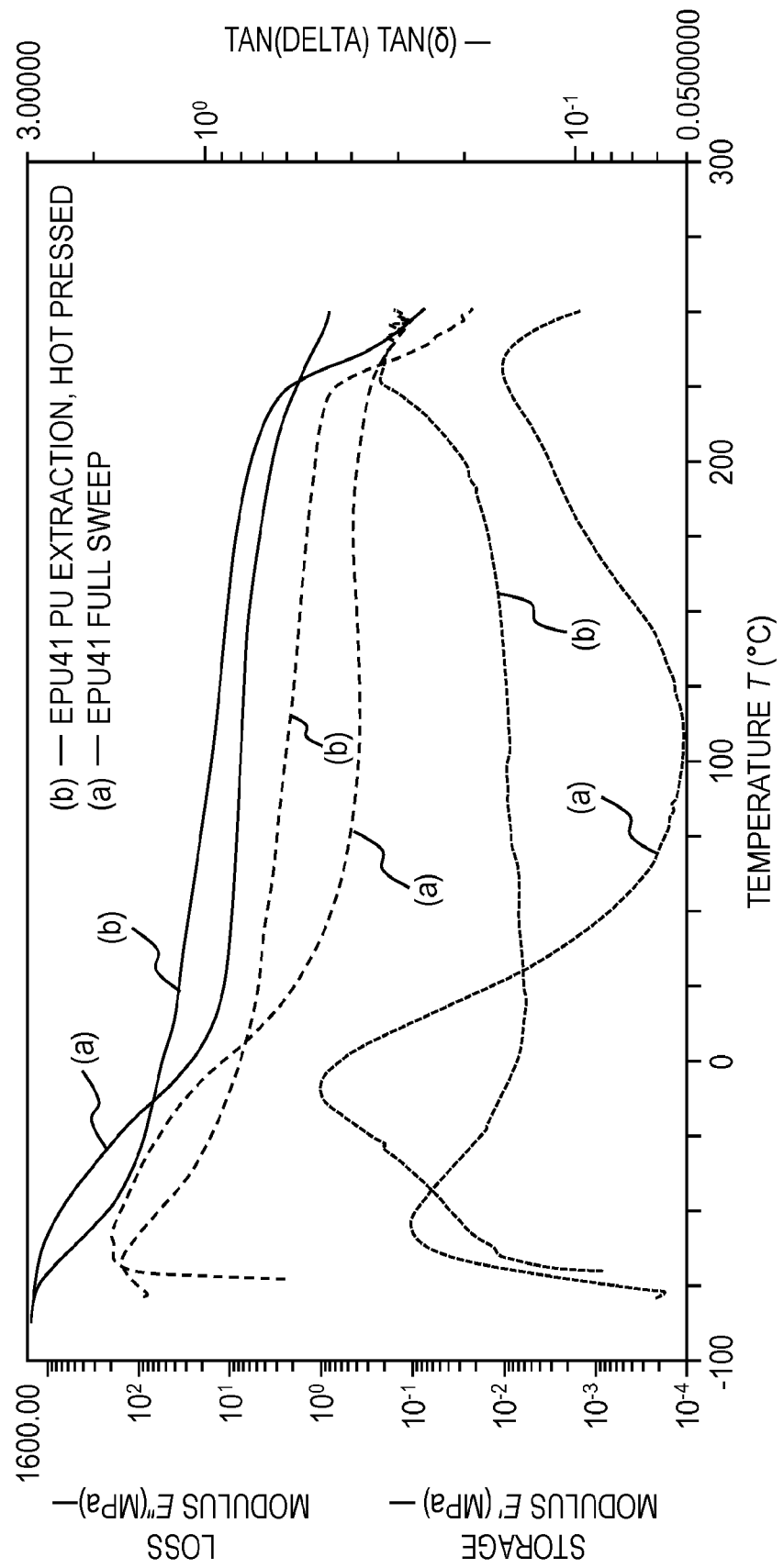

CHEMICAL RECYCLING OF ADDITIVELY MANUFACTURED OBJECTS

CROSS REFERENCE TO RELATED APPLICATIONS

This application is a 35 U.S.C. § 371 national phase application of International Application Serial No. PCT/US2021/013177, filed Jan. 13, 2021, which claims the benefit of U.S. Provisional Application No. 62/962,502, filed Jan. 17, 2020, the disclosures of which are incorporated by reference herein.

FIELD OF THE INVENTION

The present invention concerns methods of recycling additively manufactured objects produced by stereolithography.

BACKGROUND OF THE INVENTION

Additive manufacturing (or "3D printing") refers to a family of techniques including selective laser sintering (SLS), fused deposition modelilng (FDM), stereolithography (SLA), polyjet, and others. As additive manufacturing is increasingly adopted by different industries, the volume of polymer parts generated by these methods is expected to exponentially surge. From a sustainability perspective, all additive manufacturing techniques are capable of reducing material waste when compared to subtractive manufacturing techniques such as machining. However, the recyclability of products produced by different additive manufacturing process can vary. In the case of SLS and FDM, thermoplastics are used as the starting material that are thermally fused or extruded into the final part. Objects made by such techniques are theoretically recyclable through mechanical/thermal processes because of their thermoplastic nature.

However, for objects made by additive manufacturing techniques based on light curing of a liquid resin, such as SLA, the recyclability of the objects is questionable. Formulations in light-curable liquid resins can vary significantly, but generally crosslinking is used to gel a liquid resin into solid form by irradiation with light. Because the objects are crosslinked, they are thermoset, and because they are thermoset they face the recyclability challenges particular to thermoset materials. Accordingly, there is a need for new approaches for recycling objects produced by stereolithography.

SUMMARY OF THE INVENTION

Provided herein according to embodiments is a method of recycling an additively manufactured object into a reusable thermoplastic polymer, which method may include: (a) providing at least one additively manufactured object produced by stereolithography from a dual cure resin, the object comprising (i) a light polymerized polymer, and (ii) a heat polymerized polymer intermixed with said light polymerized polymer; (b) comminuting the object to produce a particulate material therefrom; (c) contacting the particulate material to a polar, aprotic solvent for a time and at a temperature sufficient to extract the heat polymerized polymer from the particulate material into said solvent, leaving residual particulate material comprising said light polymerized polymer in solid form; (d) separating the residual particulate material from said solvent; and then (e) separating the heat polymerized polymer from said solvent to provide a reusable thermoplastic polymer material in solid form.

In some embodiments, the heat polymerized polymer comprises a linear polymer, such as a linear polymer of polyurethane, polyurea, or a copolymer thereof.

In some embodiments, the light polymerized polymer comprises a polymerized blocking group (e.g., a polymerized tertiary amine-containing (meth)acrylate blocking group such as polymerized t-BAEMA).

In some embodiments, the object comprises a semi-interpenetrating network of (i) the light polymerized polymer, and (ii) the heat polymerized polymer.

In some embodiments, the polar, aprotic solvent is selected from the group consisting of beta-, gamma-, and delta-lactones, hydrofurans, hydropyrans, dihydrolevoglucosenone, 6,8-dioxabicyclo-octane, and combinations thereof.

In some embodiments, the polar, aprotic solvent is selected from the group consisting of dichloromethane, tetrahydrofuran, ethylacetate, acetone, dimethylformamide, acetonitrile, dimethylsulfoxide, propylene carbonate, N-methyl-2-pyrrolidone, dihydrolevoglucosenone, 6,8-dioxabicyclo-octane, hexamethylphosphoramide, and combinations thereof.

In some embodiments, the dry weight of the residual particulate material is about 40%, 50%, 60%, or 70% (and in some embodiments preferably less 50%) of the dry weight of the particulate material (or the object) prior to the contacting step.

In some embodiments, the step of comminuting is carried out by crushing, grinding (e.g., milling), cutting (e.g., chopping) or a combination thereof.

In some embodiments, the step of separating residual particulate material from said solvent is carried out by filtering, centrifugation, settling, or a combination thereof.

In some embodiments, the step of separating heat polymerized polymer from the solvent may be carried out by: (i) precipitating said heat polymerized polymer from said solvent; and then (ii) physically separating said heat polymerized polymer from said solvent (e.g., by filtering, centrifugation, settling, or a combination thereof); and (iii) optionally, drying said heat polymerized polymer.

In some embodiments, the step of separating heat polymerized polymer from the solvent is carried out by dry spinning or wet spinning.

In some embodiments, the method further includes a step of: thermoforming (e.g., molding, casting, extruding, etc.) the heat polymerized polymer into a recycled object or objects (e.g., pellets, sheets, films, etc.).

In some embodiments, the contacting is carried out at a temperature of 25, 30 or 35 degrees, to 50, 60, or 70 degrees Centigrade.

In some embodiments, the contacting is carried out for a time of from 1, 2 or 3 days, to 6, 8 or 10 days.

In some embodiments, the contacting is carried out by mixing the particulate material with the solvent to form a mixture, and the particulate material is provided in an amount of from 1, 5, or 10%, to 15 or 20% by weight of the mixture.

The foregoing and other objects and aspects of the present methods are explained in greater detail in the drawings herein and the specification set forth below. The disclosures of all United States patent references cited herein are to be incorporated herein by reference.

BRIEF DESCRIPTION OF THE DRAWINGS

FIG. 1 presents a dynamic mechanical analysis (DMA) curve for an original EPU 41 object (a), along with an object formed from the recycled polyurethane/urea polymer (b).

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations of one or more of the associated listed items, as well as the lack of combinations when interpreted in the alternative ("or").

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

1. Resins and Additive Manufacturing Steps.

Resins for additive manufacturing are known and described in, for example, U.S. Pat. Nos. 9,211,678, 9,205,601, and 9,216,546 to DeSimone et al. Dual cure resins useful for carrying out embodiments of the present invention are known and described in U.S. Pat. Nos. 9,676,963, 9,453,142 and 9,598,606 to Rolland et al., and in U.S. Pat. No. 10,316,213 to Arndt et al. Particular examples of suitable dual cure resins may include, but are not limited to, a dual cure polyurethane, polyurea, or copolymer thereof, such as Carbon Inc., elastomeric polyurethane, rigid polyurethane, and flexible polyurethane resins, all available from Carbon, Inc., 1089 Mills Way, Redwood City, California, USA.

Light polymerized polymers are formed from monomers and/or prepolymers that can be polymerized by exposure to actinic radiation or light. Examples of reactive end groups suitable for such light polymerizable monomers and/or prepolymers include, but are not limited to: acrylates, methacrylates, α-olefins, N-vinyls, acrylamides, methacrylamides, styrenics, epoxides, thiols, 1,3-dienes, vinyl halides, acrylonitriles, vinyl esters, maleimides, and vinyl ethers.

In some embodiments, the light polymerizable component, once polymerized, is one which can degrade (e.g., during heating or baking) to form a constituent for heat polymerization. Thus, it is converted, in part, to a heat polymerizable component, while other portions (e.g., polymerized light-reactive blocking groups such as t-BAEMA), may not participate in the further cure and remain as a light polymerized polymer. In some embodiments, additional thermally reactive components (e.g., chain extenders such as diamines or diols) are carried in the green, light cured, object, where they participate in a subsequent heat cure to form a heat polymerized polymer in the object, which is intermixed with the light polymerized polymer in the formed object.

A particular example of a light polymerizable component that, once polymerized, can degrade to form a constituent for heat polymerization, is ABPU. "ABPU" or "reactive blocked polyurethane" as used herein refers light-curable, (meth)acrylate blocked, polyurethane/polyurea such as described in U.S. Pat. Nos. 9,453,142 and 9,598,606 to Rolland et al.

Polyisocyanates (including diisocyanates) that may be used in forming the ABPU include, but are not limited to, 1,1'-methylenebis(4-isocyanatobenzene) (MDI), 2,4-diisocyanato-1-methylbenzene (TDI), methylene-bis(4-cyclohexylisocyanate) ($H_{12}$MDI), hexamethylene diisocyanate (HDI), isophorone diisocyanate (IPDI), polymeric MDI, 1,4-phenylene diisocyanate (PPDI), and o-tolidine diisocyanate (TODI). Additional examples include but are not limited to those given in U.S. Pat. No. 3,694,389 to Levy.

A particular example of a suitable reactive (or light-curable) blocking agent for isocynate groups of the ABPU is a tertiary amine-containing (meth)acrylate (e.g., t-butylaminoethyl methacrylate, t-BAEMA, tertiary pentylaminoethyl methacrylate (t-PAEMA), tertiary hexylaminoethyl methacrylate (t-HAEMA), tertiary-butylaminopropyl methacrylate (t-BAPMA), acrylate analogs thereof, and mixtures thereof).

Suitable additive manufacturing methods include bottom-up and top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the additive manufacturing step is carried out by one of the family of methods sometimes referred to as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, *Science* 347, 1349-1352 (2015); and in R. Janusziewcz et al., Layerless fabrication with continuous liquid interface production, *Proc. Natl. Acad. Sci. USA* 113, 11703-11708 (2016). Other examples of methods and apparatus for carrying out particular embodiments of CLIP include, but are not limited to: Batchelder et al., US Patent Application Pub. No. US 2017/0129169; Sun and Lichkus, US Patent Application Pub. No. US 2016/0288376; Willis et al., US Patent Application Pub. No. US 2015/0360419; Lin et al., US Patent Application Pub. No. US 2015/0331402; D.

Castanon, US Patent Application Pub. No. US 2017/0129167; L. Robeson et al., PCT Patent Pub. No. WO 2015/164234 (see also U.S. Pat. Nos. 10,259,171 and 10,434,706); C. Mirkin et al., PCT Patent Pub. No. WO 2017/210298 (see also US Pat. App. US 2019/0160733); B. Feller, US Pat App. Pub. No. US 2018/0243976; M. Panzer and J. Tumbleston, US Pat App Pub. No. US 2018/0126630; and K. Willis and B. Adzima, US Pat App Pub. No. US 2018/0290374.

2. Recycling of Additively Manufactured Objects.

Additively manufactured objects produced with dual cure resins having a light polymerized component and a heat polymerized component may be processed into reusable thermoplastic polymers by separating the heat polymerized polymer from the light polymerized polymer as taught herein. The heat polymerized polymer intermixed with the light polymerized polymer (e.g., as a linear polymer and/or semi-interpenetrating network) is extractable into solvent as taught herein.

In some embodiments, the objects may be cut or broken into smaller pieces (comminuted) into a particulate material to increase the surface area in contact with the solvent. Comminuting of the object may be carried out, for example, by crushing, grinding (e.g., milling), cutting (e.g., chopping) or a combination thereof. In some embodiments, the particulate material is provided in the solvent in an amount of from 1, 5, or 10%, to 15 or 20% by weight of the mixture.

The solvent is preferably a polar, aprotic solvent, with the object (which may be in the form of a particulate) in contact therewith for a time and at a temperature sufficient to extract the heat polymerized polymer from the object into the solvent, leaving residual object material comprising said light polymerized polymer in solid form. As an example, the contacting may be carried out at a temperature of 25, 30 or 35 degrees, to 50, 60, or 70 degrees Centigrade. The contacting may be carried out, for example, for a time of from 1, 2 or 3 days, to 6, 8 or 10 days.

The residual object material comprising the light polymerized polymer may then be optionally separated from the solvent in which the heat polymerized polymer before the heat polymerized polymer is separated or otherwise recovered from the solvent to provide a reusable thermoplastic polymer material. In some embodiments, the residual object material may be separated from the solvent by filtering, centrifugation, settling, or a combination thereof.

Suitable examples of polar, aprotic solvents that can be used in carrying out the methods described herein include, but are not limited to, beta-, gamma-, and delta-lactones, hydrofurans, hydropyrans, dihydrolevoglucosenone, 6,8-dioxabicyclo-octane, and combinations thereof. More particular examples of the foregoing include, but are not limited to, dichloromethane, tetrahydrofuran, ethylacetate, acetone, dimethylformamide (DMF), acetonitrile, dimethylsulfoxide, propylene carbonate, N-methyl-2-pyrrolidone, dihydrolevoglucosenone, 6,8-dioxabicyclo-octane, hexamethylphosphoramide, and combinations thereof (see, e.g., U.S. Pat. No. 9,376,451).

In some embodiments, the dry weight of the residual object material is not more than half (and preferably less than half) the dry weight of said object material before the extraction. For example, the dry weight may be 40%, 50%, 60%, or 70% (and in some embodiments preferably less than 50%) of the dry weight of the particulate material (or the object) prior to the extracting.

Separating the extracted heat polymerized polymer from the solvent may be carried out by, for example, (i) precipitating said heat polymerized polymer from said solvent; and then (ii) physically separating said heat polymerized polymer from said solvent (e.g., by filtering, centrifugation, settling, or a combination thereof), optionally followed by drying the recovered polymer. Fibers of the heat polymerized polymer may also be separated by methods such as wet spinning (see, e.g., US 2004/0006964 to Sironi et al.), or dry spinning (see, e.g., US 2004/0225101 to Selling et al.).

The recovered polymer may then be used to form new, recycled objects, such as by thermoforming (e.g., molding, casting, extruding, etc.) into a recycled object or objects (e.g., pellets, sheets, films, etc.).

Non-limiting examples of the present invention are provided below.

Example 1

Objects are produced by stereolithography on a Carbon Inc. M1 printer from Carbon Inc. EPU 40 dual cure polyurethane resin (both available from Carbon Inc., 1089 Mills Way, Redwood City, California, USA) and subsequently heat cured in accordance with known techniques, then are chopped into small pieces to increase the surface area. Specifically, an additively manufactured lattice midsole made from EPU 40 is chopped into pieces with dimensions less than about 5 millimeters on each side.

The solid pieces of polymerized EPU 40 are then placed in a sealable container and dimethylformamide (DMF) is added. The weight percent of EPU 40 solid in this mixture is up to 20%. The container is sealed and then heated to between 30 to 60 degrees Centigrade for three to six days, during which a linear polyurethane/urea polymer is extracted into the solvent. The remaining solid is then filtered out from the DMF solution with a mesh size smaller than the cut dimension of the objects (other physical separation methods including centrifugation, gravity, and combinations thereof can also be used).

To the remaining DMF solution, 10 to 50 weight percent water is added to precipitate white solids. The white solids are then filtered out and dried between 60 to 120 degrees Centigrade for one to 24 hours, yielding a recycled thermoplastic polyurethane/urea polymer that weighs about 40 to 70% of the original mass of the EPU 40 object. Test objects formed by hot pressing of the white solids are subject to dynamic mechanical analysis (DMA) and the material is found to have phase-separated structure characteristic of a typical polyurethane/urea material.

Example 2

This example was carried out in the same manner as described for Example 1 above, except that Carbon Inc. EPU 41 dual cure polyurethane resin was used. Test objects formed by hot pressing of the white solids were subject to dynamic mechanical analysis (DMA), and the material was found to have a phase-separated structure characteristic of a typical polyurethane/urea material, as shown in FIG. 1.

The foregoing is illustrative of the present invention and is not to be construed as limiting thereof. The invention is defined by the following claims, with equivalents of the claims to be included therein.

What is claimed is:

1. A method of recycling additively manufactured object into a reusable thermoplastic polymer, comprising:
   (a) providing at least one additively manufactured object produced by stereolithography from a dual cure resin, the object comprising a semi-interpenetrating network of (i) a light polymerized polymer, and (ii) a heat polymerized polymer;

(b) comminuting the object to produce a particulate material therefrom;

(c) contacting the particulate material to a polar, aprotic solvent for a time and at a temperature sufficient to extract the heat polymerized polymer from the particulate material into said solvent, leaving residual particulate material comprising said light polymerized polymer in solid form, wherein the dry weight of said residual particulate material is from 40% to 70% of the dry weight of the particulate material prior to the contacting step;

(d) separating the residual particulate material from said solvent; and then (e) separating the heat polymerized polymer from said solvent to provide a reusable thermoplastic polymer material in solid form.

2. The method of claim 1, wherein said heat polymerized polymer comprises a linear polymer.

3. The method of claim 2, wherein said linear polymer is comprised of polyurethane, polyurea, or a copolymer thereof.

4. The method of claim 1, wherein said light polymerized polymer comprises a polymerized blocking group.

5. The method of claim 1, wherein the polar, aprotic solvent is selected from the group consisting of beta-, gamma-, and delta-lactones, hydrofurans, hydropyrans, dihydrolevoglucosenone, 6,8-dioxabicyclo-octane, and combinations thereof.

6. The method of claim 1, wherein the polar, aprotic solvent is selected from the group consisting of dichloromethane, tetrahydrofuran, ethylacetate, acetone, dimethylformamide, acetonitrile, dimethylsulfoxide, propylene carbonate, N-methyl-2-pyrrolidone, dihydrolevoglucosenone, 6,8-dioxabicyclo-octane, hexamethylphosphoramide, and combinations thereof.

7. The method of claim 1, wherein said step of comminuting is carried out by crushing, grinding, cutting, or a combination thereof.

8. The method of claim 1, wherein said step of separating residual particulate material from said solvent is carried out by filtering, centrifugation, settling, or a combination thereof.

9. The method of claim 1, wherein said step of separating heat polymerized polymer from said solvent is carried out by:

(i) precipitating said heat polymerized polymer from said solvent; and then (ii) physically separating said heat polymerized polymer from said solvent and (iii) optionally, drying said heat polymerized polymer.

10. The method of claim 1, wherein said step of separating heat polymerized polymer from said solvent is carried out by wet spinning or dry spinning.

11. The method of claim 1, further comprising a step of: thermoforming said heat polymerized polymer into a recycled object or objects.

12. The method of claim 1, wherein the contacting is carried out at a temperature of 25 degrees to 70 degrees Centigrade.

13. The method of claim 1, wherein the contacting is carried out for a time of from 1 day to 10 days.

14. The method of claim 1, wherein the contacting is carried out by mixing the particulate material with the solvent to form a mixture, and the particulate material is provided in an amount of from to 20% by weight of the mixture.

15. The method of claim 4, wherein the polymerized blocking group comprises a polymerized tertiary amine-containing (meth)acrylate blocking group.

16. The method of claim 1, wherein the dry weight of said residual particulate material of the contacting step is from 40% to 50% of the dry weight of the particulate material prior to the contacting step.

17. The method of claim 11, wherein said thermoforming comprises molding, casting, or extruding.

18. The method of claim 11, wherein said recycled object or objects comprise pellets, sheets, or films.

* * * * *